United States Patent [19]
Lee

[11] Patent Number: 5,566,928
[45] Date of Patent: Oct. 22, 1996

[54] SUSPENSION DEVICE FOR A COMMERCIAL VEHICLE

[75] Inventor: Choon-Guen Lee, Kyungsangnam-do, Rep. of Korea

[73] Assignee: Hyundai Motor Company, Ltd., Seoul, Rep. of Korea

[21] Appl. No.: 453,065

[22] Filed: May 26, 1995

[30] Foreign Application Priority Data

May 28, 1994 [KR] Rep. of Korea .................... 94-11738

[51] Int. Cl.⁶ ............................................. B60G 9/02
[52] U.S. Cl. ............................................. 267/31; 267/271
[58] Field of Search ........................... 267/192, 193, 267/225, 227, 24, 31, 32, 263, 265, 271, 116, 139

[56] References Cited

U.S. PATENT DOCUMENTS 1,982,398  11/1934  Pieper ........................ 267/31
4,463,936  8/1984  Shinbori et al. ............ 267/271 X

FOREIGN PATENT DOCUMENTS 533146  3/1993  Japan ........................ 267/31

Primary Examiner—Josie Ballato
Attorney, Agent, or Firm—Birch, Stewart, Kolasch & Birch, LLP

[57] ABSTRACT

A suspension device for a commercial vehicle includes a leaf spring member, a shackle pivotally connected to the leaf spring and a frame, a first piston cylinder member fixed to the center of the leaf cylinder, and a second piston cylinder member pivotally connected to the shackle and in communication with the first piston cylinder member through an oil conduit whereby upon being fully loaded with goods, the suspension device prevents the vehicle from rolling when the vehicle turns, and improves a comfortable feeling of entering the vehicle and handling of the vehicle.

4 Claims, 2 Drawing Sheets

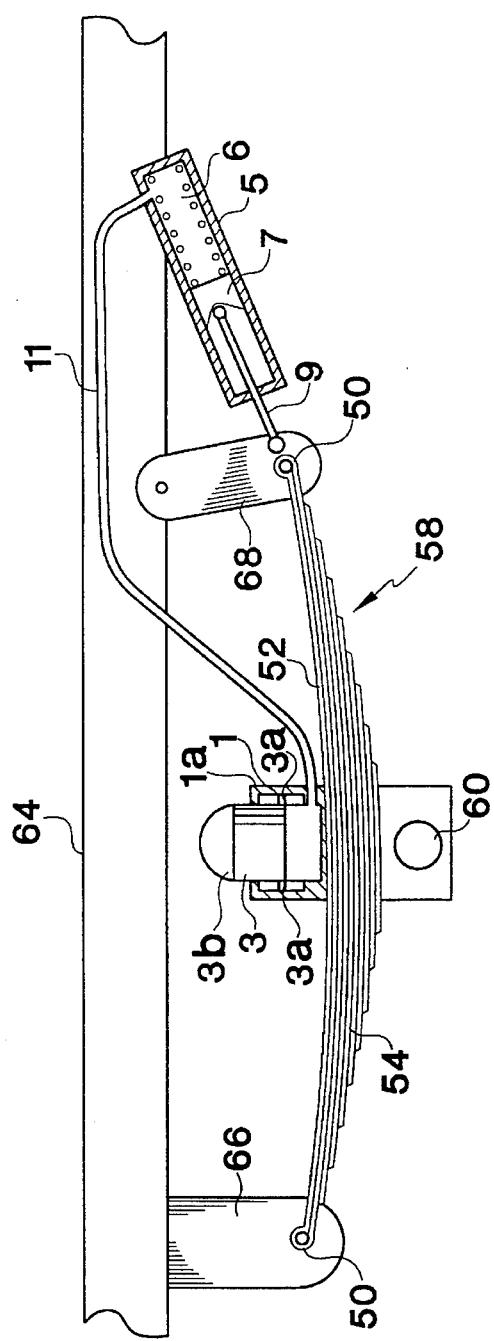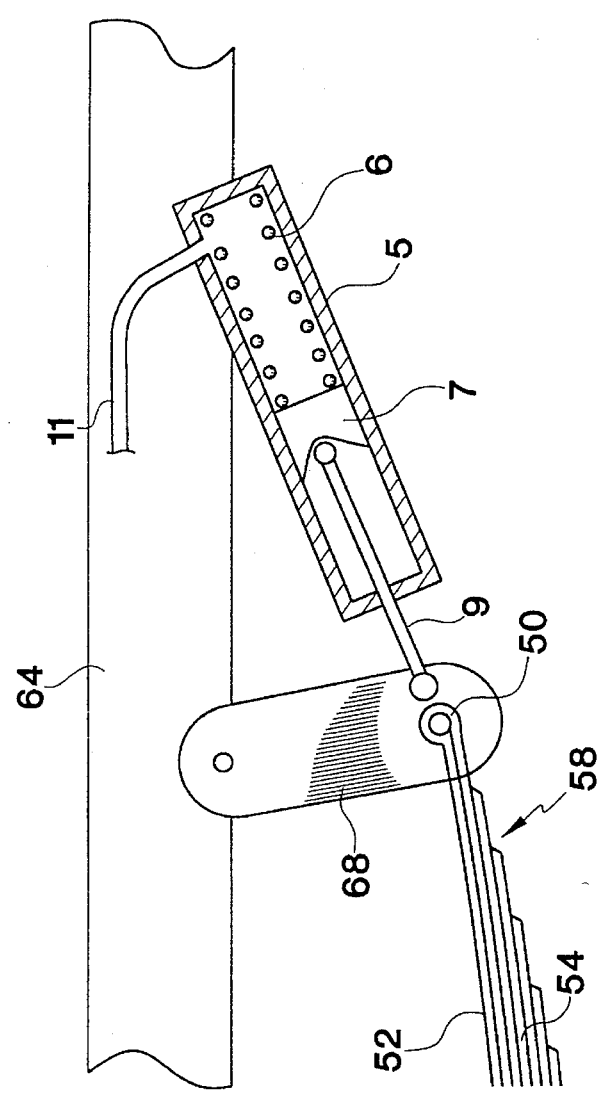

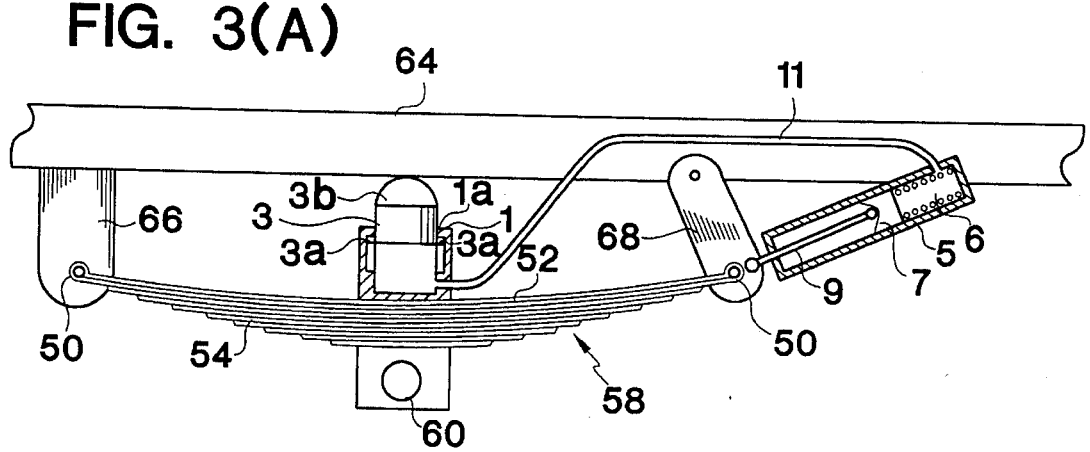
FIG. 3(A)
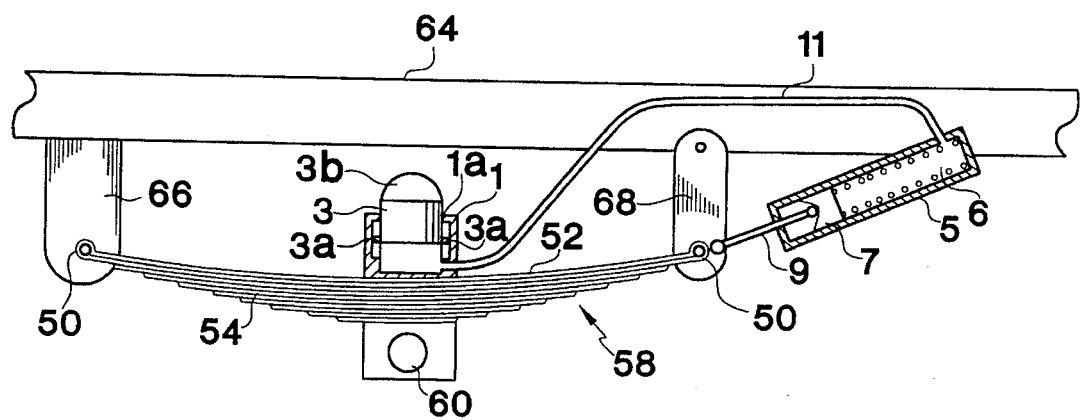
FIG. 3(B)
FIG. 4
CONVENTIONAL ART
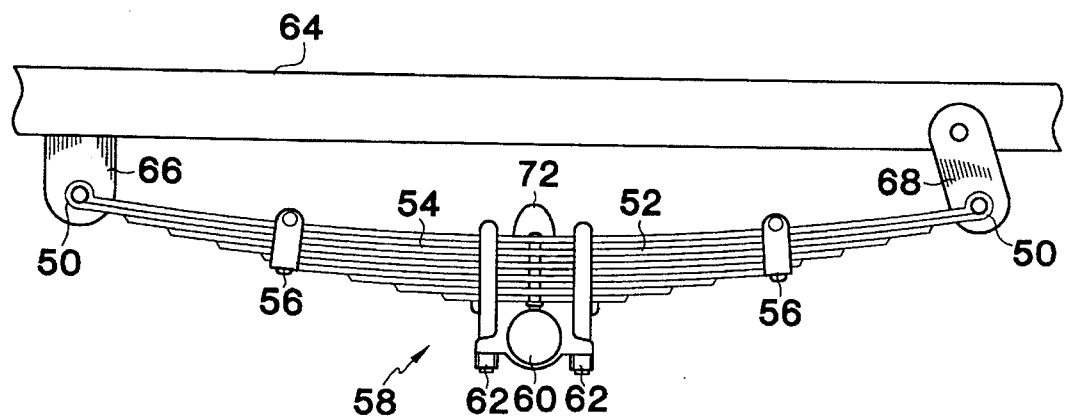

SUSPENSION DEVICE FOR A COMMERCIAL VEHICLE

BACKGROUND OF THE INVENTION

1. Field of the Invention

The present invention relates to a suspension device for a commercial vehicle and more particularly, to an improved suspension device including a leaf spring member and a pair of piston cylinder members operatively connected to the leaf spring member for preventing the vehicle from rolling and improving the feeling of entering the vehicle and handling of the vehicle.

2. Description of Related Art

Various types of suspension devices for a commercial vehicle are known in the art. Generally, most commercial vehicles including large sized trucks have an axle suspension device which includes an axle connected to right and left wheels, respectively, each axle including a spring member suspended from the vehicle frame. Such a spring member is either a parallel leaf spring or a cross leaf spring, but preferably a parallel leaf spring. Also, the parallel leaf spring has a number of advantages such as for example, it does not require an additional axle support since the parallel leaf spring supports the axle in a regular position and it is simple in structure.

However, this conventional leaf spring member suffers from a number of problems such as for example, it must be a large flexible spring since this spring has to transfer driving force, braking force, and centrifugal force to the frame from the wheels. Further, the conventional leaf spring does not exhibit an improved feeling of entering the vehicle and handling the vehicle, and it does not prevent the vehicle from rolling when the vehicle turns.

As shown in FIG. 4, the conventional suspension device including a parallel leaf spring member 58, comprises a main leaf 52 having a pair of eyes 50 disposed at opposing longitudinal ends thereof, a plurality of spring plates 54 of gradually increasing lengths and each having a large bending degree stacked down one-by-one, a pair of clip bands 56 for clipping the spring plates 54 to the main leaf 52 for forming a composite structure, an axle 60, and a plurality of U-bolts 62 for attaching the leaf spring 58 to the axle 60.

The leaf spring 58 is connected to a spring hanger 66 fixed to a vehicle frame 64 at one end and, at the other end thereof, is pivotally connected to a shackle 68 pivotally connected to the vehicle frame 64 for absorbing the change of a span of the leaf spring 58 when the leaf spring transforms so the suspension device is attempting to reduce impact and rolling of the vehicle in response to the rough road surface.

Even though the conventional suspension device provides a rubber bump stopper 72 fixed to the main leaf spring 52 for absorbing and buffering impact from the ground, since the rubber bump stopper 72 has a certain bump clearance, the conventional suspension device cannot prevent rolling, and does not improve feeling of entering the vehicle and handling of the vehicle whether the vehicle is fully loaded with goods or not.

Accordingly, in order to improve handling of the vehicle, if the conventional suspension device provides a narrow bump clearance, the feeling of entering the car decreases since the spring functions in lower degree or range of motion and the bump stopper 72 hits the frame 64 while the vehicle is driving on a rough road. On the contrary, if the conventional suspension device provides a wide bump clearance, the possibility of rolling of the vehicle is dangerously increased since when the vehicle turns, a rolling angle is large.

SUMMARY OF THE INVENTION

Accordingly, it is an object of the present invention to provide a suspension device for a commercial vehicle, which eliminates the above problems encountered with the conventional suspension devices for a commercial vehicle.

Another object of the present invention is to provide an improved suspension device for a commercial vehicle, which includes a leaf spring member, and a pair of piston cylinder members operatively connected to the leaf spring member for preventing the vehicle from rolling when the vehicle turns and improving the feeling of entering the vehicle and handling of the vehicle.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a suspension device including a leaf spring member, a shackle pivotally connected between the leaf spring member and a vehicle frame, a first piston cylinder member fixed to the center of the leaf cylinder, and a second piston cylinder member pivotally connected to the shackle and in communication with the first piston cylinder member through an oil conduit, whereby upon being fully loaded with goods, the suspension device prevents the vehicle from rolling when the vehicle turns, and improves a comfortable feeling of entering the vehicle and handling of the vehicle.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a partially diagrammatic side view of a suspension device for a commercial vehicle according to the present invention;

FIG. 2 is an enlarged diagrammatic side view of a second piston cylinder member of the suspension device according to the present invention;

FIG. 3(A) is a partially diagrammatic side view of the suspension device for a commercial vehicle in a bump state according to the present invention;

FIG. 3(B) is a partially diagrammatic side view of the suspension device for a commercial vehicle in a rebound state according to the present invention; and FIG. 4 is a somewhat diagrammatic side view of a conventional suspension device for a commercial vehicle.

DETAILED DESCRIPTION OF THE PREFERRED EMBODIMENTS

Referring now in detail to the drawings for the purpose of illustrating preferred embodiments of the present invention, the suspension device for a commercial vehicle as shown in FIGS. 1 and 2, includes a leaf spring 58 having a pair of spring eyes 50 disposed at opposing longitudinal ends thereof, and a frame 64 having a spring hanger 66 fixed thereto and a shackle 68 pivotally mounted thereto, such that one end of the leaf spring is fixed with respect to the frame 64 and the other end of the leaf spring is movable with respect to the frame 64. A first cylinder 1 is fixed to the center of the leaf spring 58, and a second cylinder 5 is operatively connected to the leaf spring 58 through the shackle 68 and in communication with the first cylinder 1 through an oil conduit 11.

The first cylinder 1 includes a first piston 3 36 disposed within the first cylinder 1, and a rubber stopper 5 disposed on the top of the first piston 3. The first piston 3 provides an annular raised portion 3a extending from a circumference at the lowest end thereof for preventing the piston 3 from separating from the cylinder 1, and a guide area 1a for guiding the annular raised portion 3a.

The second cylinder 5 includes a second piston 7 having a resilient material 6 such as a coil spring disposed within the second cylinder 5, and a connecting rod 9 connected to the piston 7 and the shackle 68. The second piston 7 generates an oil pressure by pressing the resilient material 7. In other words, when the vehicle is fully loaded with goods, the leaf spring 58 transforms and, at this time, the shackle 68 rotates in a counterclockwise direction. Therefore, the connecting rod 9 presses against the second piston 7 for creating the oil pressure therein. The oil pressure transfers to the first cylinder 1 through the oil conduit 11. Accordingly, the first piston 3 moves up and the rubber stopper 36 supports the frame 64 as shown in FIG. 3(A).

The generation of the oil pressure in the present invention includes an actuator as an another embodiment of the present invention. That is, the actuator (not shown) is operated by an electric output signal after a sensor detects the angle of rotation of the shackle 68.

The leaf spring 58 includes a main leaf 52, a plurality of spring plates 54 having gradually increasing lengths and big bending degree plates stacked down one-by-one, and a plurality of U-bolts 62 (not shown) for attaching the leaf spring 58 to an axle 60.

As shown in FIGS. 3(A) and 3(B), the suspension device according to the present invention operates as follows. When the vehicle is fully loaded with goods and turns, one of right and the left wheels performs a bump operation, and the other performs a rebound operation due to rolling of the vehicle. For example, if a left wheel performs the bump operation as shown in FIG. 3(A), a right wheel performs the rebound operation as shown in FIG. 3(B).

First of all, as shown in FIG. 3(A), the axle 60 is pushed backward causing a camber angle of the leaf spring 58, so that the shackle 68 rotates in the counterclockwise direction. Therefore, the connecting rod 9 pushes to the second piston 7 against the coil spring 6 for generating the oil pressure. The oil pressure in the second cylinder 5 is delivered to the first cylinder 1. At this time, the second piston 3 moves up so as to form a narrow bump clearance for preventing the vehicle from rolling and improving handling of the vehicle.

As shown in FIG. 3(B), if the rebound operation actuates, the axle 60 moves forward and the shackle 68 rotates in the clockwise direction. Therefore, the second piston 7 returns to the original position by biasing of the spring 6. At this time, the oil pressure supplied to the first cylinder 1 returns to the second cylinder 5. Also, the bump clearance is wide for improving the feeling of entering the vehicle. Thus, operation of the suspension device according to the present invention satisfies the geometric characteristics of the leaf spring 58.

Accordingly, the suspension device for a commercial vehicle such as a truck and the like according to the present invention advantageously changes the bump clearance by utilizing the geometric characteristics of the leaf spring 58 depending upon a loading state of being fully loaded with goods or not, and the ,direction of turning of the vehicle, so that the suspension device has a simple structure, prevents the vehicle from rolling, and improves a feeling of entering the vehicle and handling of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension device for a commercial vehicle, said suspension device comprising:

a pair of leaf springs fixed to opposing lateral sides of a frame through a spring hanger at one end of each said leaf spring, and pivotally connected to said frame through a shackle at the other end of each said leaf spring;

an axle fixed to a lower center portion of each said leaf spring;

a first cylinder attached to an upper center portion of each said leaf spring, said first cylinder including a first piston disposed therein;

a second cylinder operatively connected to the shackle through a connecting rod, said second cylinder including a second piston disposed therein for operatively connecting to the connecting rod; and an oil conduit communicating with both said first and second cylinders for transferring an oil pressure therebetween, whereby during loading or unloading, when one end of the axle is in a bump state, and the opposing end is in a rebound state, the bumped end of the axle moves backward and the shackle pivotally moves in a counterclockwise direction and then the connecting rod compresses the second piston for generating the oil pressure, thereafter the oil pressure pushes up the first piston for forming a narrow bump clearance, and the rebounded end of the axle moves forward, such that the shackle pivotally moves in a clockwise direction, the connecting rod and the second piston return to the original position, and then the oil pressure returns and the second piston moves down for forming a wide bump clearance, so that the suspension device prevents the vehicle from rolling when the vehicle turns while fully loaded, and improves the feeling of entering the vehicle and handling of the vehicle.

2. The suspension device of claim 1, wherein said first cylinder further includes a rubber stopper disposed on the top of said first piston, an annular raised flange portion extending from a lowest end of said first piston for preventing the first piston from separating from the first cylinder, and a guide recess for guiding the annular raised portion.

3. The suspension device of claim 1, wherein said second cylinder further includes a resilient material attached to the inner side of said second piston, said second piston having a groove disposed at the outer side thereof for receiving the connecting rod.

4. The suspension device of claim 3, wherein said resilient material is a spring.

* * * * *